United States Patent
Hendrix et al.

(10) Patent No.: US 10,914,961 B2
(45) Date of Patent: Feb. 9, 2021

(54) OPTICAL POLARIZING FILTER

(71) Applicant: Viavi Solutions Inc., Milpitas, CA (US)

(72) Inventors: Karen Denise Hendrix, Santa Rosa, CA (US); Scott Rowlands, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 113 days.

(21) Appl. No.: 15/431,344

(22) Filed: Feb. 13, 2017

(65) Prior Publication Data

US 2018/0231791 A1    Aug. 16, 2018

(51) Int. Cl.
   *G02B 27/28*  (2006.01)
   *G02B 5/30*   (2006.01)
   *G02B 5/28*   (2006.01)

(52) U.S. Cl.
   CPC ......... *G02B 27/283* (2013.01); *G02B 5/3041* (2013.01); *G02B 5/3066* (2013.01); *G02B 5/28* (2013.01); *G02B 5/281* (2013.01)

(58) Field of Classification Search
   CPC .............. G02B 5/208; G02B 5/28–281; G02B 5/285–288; G02B 5/3041–305; G02B 5/3066; G02B 13/008; G02B 27/1006; G02B 27/141–142; G02B 27/283; G02B 27/288
   USPC .......................... 359/350, 352, 355–357, 359, 359/485.02–485.04, 487.04, 488.01, 583, 359/586, 588–590, 601, 722–723
   See application file for complete search history.

(56) References Cited

U.S. PATENT DOCUMENTS 5,912,762 A * 6/1999 Li ........................ H04N 9/3167
                                                    348/E9.027
7,297,393 B2   11/2007 Jonza et al.
8,879,152 B2   11/2014 Junger et al.
(Continued)

FOREIGN PATENT DOCUMENTS

EP         0 573 905       12/1993
WO    WO 2010/025536 A1    3/2010
(Continued)

OTHER PUBLICATIONS

Sato, Takashi et al., "Scattering mechanism and reduction of insertion losses in a laminated polarization splitter," Applied Optics 33:30, pp. 6925-6934, Oct. 1994.*
(Continued)

*Primary Examiner* — Derek S. Chapel
(74) *Attorney, Agent, or Firm* — Harrity & Harrity, LLP (57) ABSTRACT

An optical filter may include a substrate. The optical filter may include a set of alternating high refractive index layers and low refractive index layers disposed onto the substrate to polarization beam split incident light. The set of alternating high refractive index layers and low refractive index may layers may be disposed such that a first polarization of the incident light with a spectral range of less than approximately 800 nanometers (nm) is reflected by the optical filter and a second polarization of the incident light with a spectral range of greater than approximately 800 nm is passed through by the optical filter. The high refractive index layers may be hydrogenated silicon (Si:H). The low refractive index layers may be silicon dioxide ($SiO_2$).

20 Claims, 4 Drawing Sheets

(56) References Cited

U.S. PATENT DOCUMENTS

| | | | |
|---|---|---|---|
| 10,168,459 B2* | 1/2019 | Ockenfuss | G02B 5/207 |
| 2012/0327248 A1 | 12/2012 | Tack et al. | |
| 2014/0267849 A1 | 9/2014 | Geelen et al. | |
| 2014/0267878 A1 | 9/2014 | Geelen et al. | |
| 2015/0036138 A1 | 2/2015 | Watson et al. | |
| 2015/0144770 A1 | 5/2015 | Choi | |
| 2016/0238759 A1 | 8/2016 | Sprague et al. | |
| 2019/0146131 A1* | 5/2019 | Ockenfuss | G02B 5/207 |
| | | | 359/359 |
| 2019/0219748 A1* | 7/2019 | Bradley, Jr. | G01J 1/0488 |
| 2019/0285784 A1* | 9/2019 | Ockenfuss | G01J 1/0488 |
| 2019/0285785 A1* | 9/2019 | Ockenfuss | G01J 1/0488 |

FOREIGN PATENT DOCUMENTS

| | | |
|---|---|---|
| WO | WO 2013/064510 | 5/2013 |
| WO | WO 2014/014930 | 1/2014 |

OTHER PUBLICATIONS

Lapray et al., "Multispectral Filter Arrays: Recent Advances and Practical Implementation," http://www.mdpi.com/1424-8220/14/11/21626, Nov. 17, 2014, 34 pages.

Extended European Search Report corresponding to EP 18 15 3121, dated Oct. 11, 2018, 13 pages.

Partial European Search Report corresponding to EP 18 15 3121, dated Jun. 25, 2018, 14 pages.

B.M. Lairson et al. "Reduced Angle-Shift Infrared Bandpass Filter Coatings," SPIE Defense and Security Symposium; Mar. 16-20, 2018, XP055482512, 6 pages.

\* cited by examiner

FIG. 1

| Material | Refractive Index* |
|---|---|
| $SiO_2$ | 1.47 |
| $Ta_2O_5$ | 2.12 |
| $Nb_2O_5$ | 2.28 |
| Si:H | 3.65 |

OPTICAL POLARIZING FILTER

BACKGROUND

In some instances, it may be desirable to block certain wavelengths of energy and/or only transmit certain wavelengths energy to a detector. For example, some detectors may be sensitive to energy in certain wavelengths. In one example, an optical transmitter may emit light that is ultimately received by an optical receiver. For example, in a gesture recognition system, the optical transmitter may transmit near infrared (NIR) light toward a user, and the NIR light may be reflected off the user toward the optical receiver. In this case, the optical receiver may capture information regarding the NIR light, and the information may be used to identify a gesture being performed by the user. For example, a device may use the information to generate a three dimensional representation of the user, and to identify the gesture being performed by the user based on the three dimensional representation. However, during transmission of the NIR light toward the user and/or during reflection from the user toward the optical receiver, ambient light may interfere with the NIR light. Thus, the optical receiver may be optically coupled to an optical filter, such as a bandpass filter, to filter ambient light and to pass through NIR light toward the optical receiver.

In some instances, the optical filter may include a polarizing beamsplitter. In general, a polarizing beamsplitter physically separates an incident beam of energy into two linearly polarized sub-beams ("P" and "S"). One "sub-beam" contains "P" polarized energy (e.g., the electric field is parallel or within the plane of incidence of the incident beam). The second "sub-beam" contains "S" polarized energy (e.g., the electric field is perpendicular to the plane of incidence of the incident beam).

SUMMARY

According to some possible implementations, a polarizing optical coating may include a set of layers. The set of layers may include a first subset of layers. The first subset of layers may include hydrogenated silicon (Si:H) with a first refractive index. The set of layers may include a second subset of layers. The second subset of layers may include a material with a second refractive index. The second refractive index may be less than the first refractive index.

According to some possible implementations, an optical filter may include a substrate. The optical filter may include a set of alternating high refractive index layers and low refractive index layers disposed onto the substrate to polarization beam split incident light. The set of alternating high refractive index layers and low refractive index may layers may be disposed such that a first polarization of the incident light with a spectral range of less than approximately 800 nanometers (nm) is reflected by the optical filter and a second polarization of the incident light with a spectral range of greater than approximately 800 nm is passed through by the optical filter. The high refractive index layers may be hydrogenated silicon (Si:H). The low refractive index layers may be silicon dioxide (SiO$_2$).

According to some possible implementations, an optical system may include an optical transmitter to emit near-infrared (NIR) light. The optical system may include a polarizing optical filter to filter an input optical signal and provide the filtered input optical signal. The input optical signal may include the NIR light from the optical transmitter and ambient light from another optical source. The polarizing optical filter may include a set of dielectric thin film layers. The set of dielectric thin film layers may include a first subset of layers of hydrogenated silicon with a first refractive index. The set of dielectric thin film layers may include second subset of layers of a material with a second refractive index less than the first refractive index. The filtered input optical signal may include a reduced intensity of ambient light relative to the input optical signal. An optical receiver may receive the filtered input optical signal and provide an output electrical signal.

DETAILED DESCRIPTION

The following detailed description of example implementations refers to the accompanying drawings. The same reference numbers in different drawings may identify the same or similar elements. As used herein, the terms "substantially," "approximately," and "about" indicate a range of values within +/−5% of a stated value.

An optical receiver may receive light initiating from an optical source, such as an optical transmitter. For example, the optical receiver may receive near infrared (NIR) light from the optical transmitter and reflected off a target, such as a user or an object. In this case, the optical receiver may receive the NIR light as well as ambient light, such as visible spectrum light. The ambient light may reduce an accuracy of a determination relating to the NIR light. For example, in a gesture recognition system, the ambient light may reduce an accuracy of generation of a three-dimensional image of the target based on the NIR light. Thus, the optical receiver may be optically coupled to an optical filter, such as a bandpass filter, to filter ambient light and to pass through NIR light toward the optical receiver.

The optical filter may include a set of dielectric thin film layers. The set of dielectric thin film layers are selected and deposited to block a portion of out-of-band light below and/or above a particular threshold, such as below 700 nanometers (nm). For example, the set of dielectric thin film layers may be selected to filter out the ambient light. The optical filter may perform a polarization beamsplitting functionality for the light. For example, the optical filter may reflect a first portion of the light with a first polarization and may pass through a second portion of the light with a second polarization when the second polarization is desired to be received by the optical receiver.

However, an excess quantity of dielectric thin film layers may result in a relatively thick coating. The relatively thick coating may be expensive to manufacture as a result of sequential deposition of each dielectric thin film layer, and may experience an excessive stress condition resulting in poor durability. Moreover, the relatively thick coating may be associated with an insufficient flatness for a polarization beamsplitting functionality. Furthermore, when silicon layers are used for a portion of the dielectric thin film layers, the silicon layers may be associated with a relatively high absorption coefficient for light below approximately 1100 nm, which may make the silicon layers unsuitable for utilization as a high index material in a polarizing beamsplitter with a relatively high transmission requirement for a pass band below approximately 1100 nm.

Implementations, described, herein, may utilize a hydrogenated silicon (Si:H) material as a set of high index layers for polarizing optical coating, such as an optical polarizing filter. In this way, the optical filter (i.e., the polarizing optical coating) may reflect ambient light and pass through NIR light, and may perform a polarization beamsplitting functionality. Based on using hydrogenated silicon as a material for the set of high index layers of the optical filter, a thickness of the optical filter and a cost of the optical filter are reduced, and a durability of the optical filter and a set of optical characteristics of the optical filter are improved relative to utilizing another type of material for the optical filter.

Figure 1:
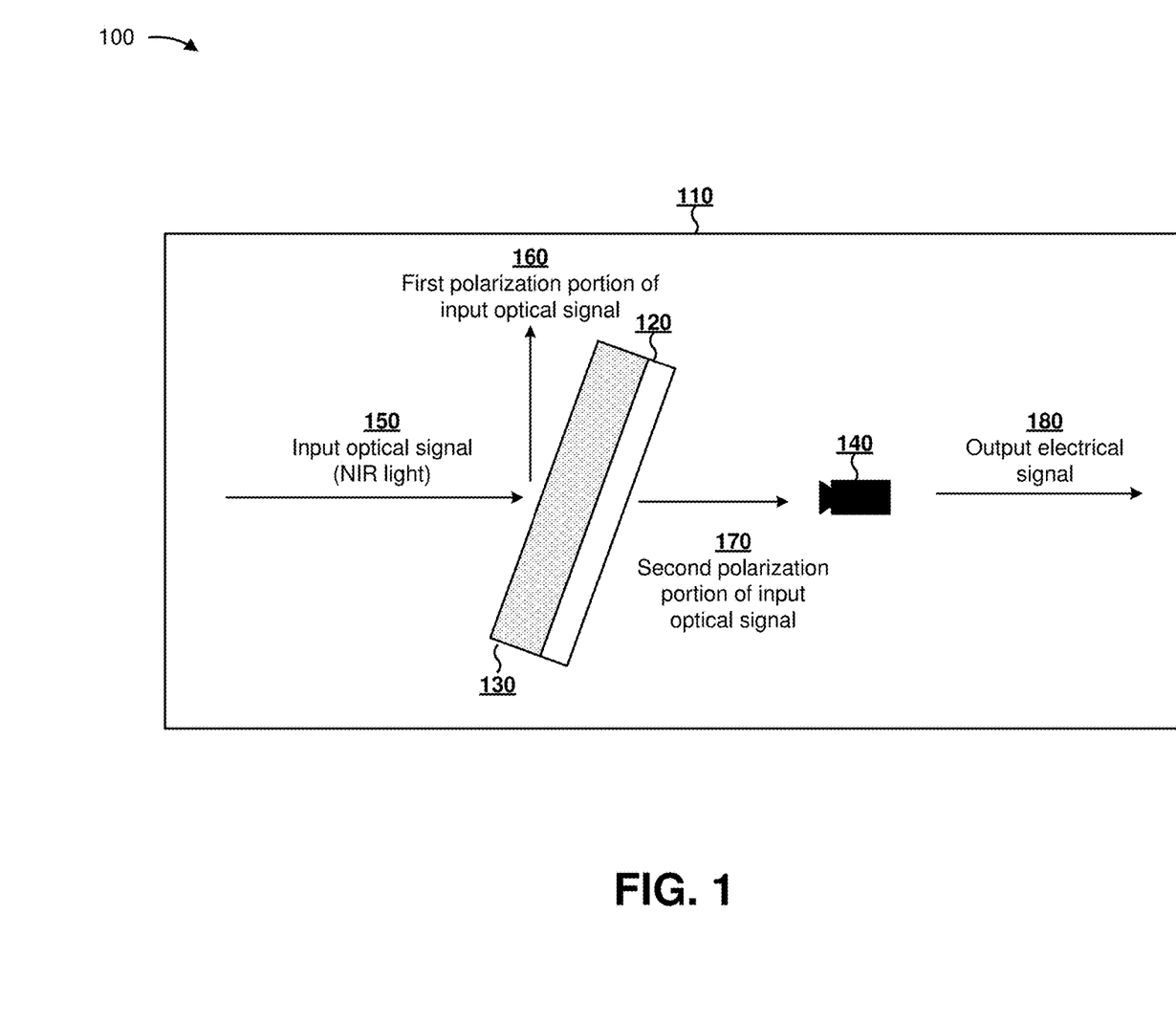
FIG. 1 is a diagram of an overview of an example implementation described herein.

FIG. 1 is a diagram of an overview of an example implementation 100 described herein. As shown in FIG. 1, example implementation 100 includes a sensor system 110. Sensor system 110 may be a portion of an optical system, and may provide an electrical output corresponding to a sensor determination. Sensor system 110 includes an optical filter structure 120, which includes an optical filter 130, and an optical sensor 140. For example, optical filter structure 120 may include a polarizing beamsplitter optical filter 130 that performs a passband filtering functionality.

It should be understood that the implementations, described herein may be utilized for a traditional polarizing beamsplitter (e.g., the P-polarized energy is transmitted and S-polarized energy is reflected) and/or a reverse polarization beamsplitting (e.g., the P-polarized energy is reflected and S-polarized energy is transmitted).

Although implementations, described herein, may be described in terms of an optical filter in a sensor system, implementations described herein may be used in another type of system, may be used external to a system, or the like.

As further shown in FIG. 1, and by reference number 150, an input optical signal is directed toward optical filter structure 120 that is a polarizing optical coating. The input optical signal may include but is not limited to NIR light initially emitted by an optical transmitter and ambient light from the environment in which sensor system 110 is being utilized. For example, an optical transmitter may direct NIR light toward a user for a gesture recognition system, and the NIR light may be reflected off the user toward optical sensor 140 to permit optical sensor 140 to perform a measurement of the NIR light. In this case, ambient light may be directed toward optical sensor 140 from one or more ambient light sources (e.g., a light bulb or the sun). In another example, the optical transmitter may direct NIR light toward another type of object, such as a for detecting objects in proximity to a vehicle, detecting objects in proximity to a blind person, detecting a proximity to an object (e.g., using a LIDAR technique), or the like, and optical sensor 140 may receive the NIR light and ambient light as a result.

As further shown in FIG. 1, and by reference number 160, a first portion of the optical signal is reflected by optical filter 130 and optical filter structure 120 with a first polarization. For example, alternating hydrogenated silicon layers (e.g., a high index material) and another type of material layers (e.g., a low index material, such as silicon dioxide ($SiO_2$)) of optical filter 130, may cause the first polarization of light to be reflected in a first direction. (It should be noted that any layer may additionally include nitrogen, germanium, argon, and/or other elements.) As shown by reference number 170, a second portion of the optical signal is passed through by optical filter 130 and optical filter structure 120 with a second polarization. For example, optical filter 130 may pass through a second polarization of light in a second direction toward optical sensor 140. In this case, optical filter 130 blocks visible light without excessively blocking NIR light, as described in more detail herein.

As further shown in FIG. 1, and by reference number 180, based on the second portion of the optical signal being passed to optical sensor 140, optical sensor 140 may provide an output electrical signal for sensor system 110, such as for use in recognizing a gesture of the user or detecting the presence of an object. In some implementations, another arrangement of optical filter 130 and optical sensor 140 may be utilized. For example, rather than passing the second portion of the optical signal collinearly with the input optical signal, optical filter 130 may direct the second portion of the optical signal in another direction toward a differently located optical sensor 140.

In a traditional polarizing beamsplitter, the first polarization portion of input optical signal 160 may be reflected S-polarized light and the second polarization portion of input optical signal 170 may be transmitted P-polarized light. In contrast, in a reverse polarizing beamsplitter, the first polarization portion of input optical signal 160 may be reflected P-polarized light and the second polarization portion of input optical signal 170 may be transmitted S-polarized light. It should also be understood that in some implementations, the energy may travel in the opposite direction to that shown in in FIG. 1, and instead of polarizing one beam, the optical filter 130 may combine two beams.

As indicated above, FIG. 1 is provided merely as an example. Other examples are possible and may differ from what was described with regard to FIG. 1.

Figure 2:
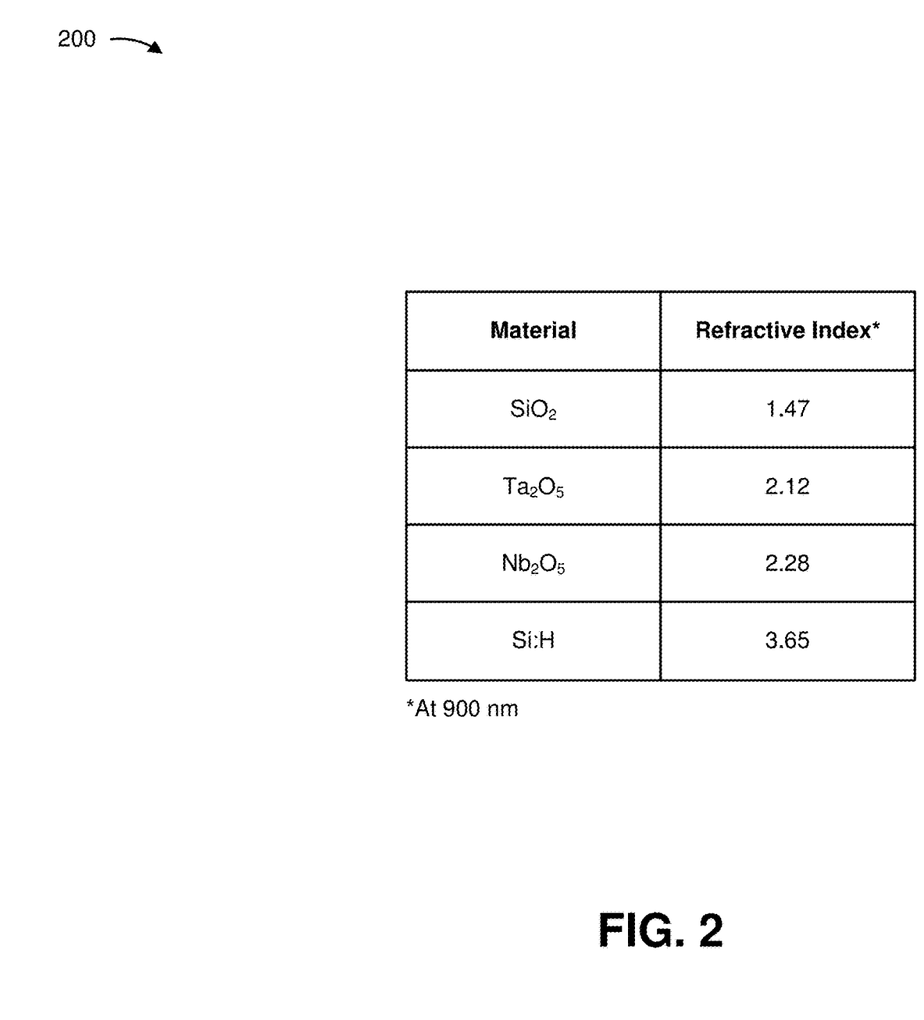
FIG. 2 is a table of refractive indices for a set of materials relating to an example implementation described herein.

FIG. 2 is an example table 200 of refractive indices for a set of materials that may be used for implementations, described herein. As shown in FIG. 2, table 200 identifies a set of materials and a corresponding set of refractive indices for the set of materials. In this case, the set of refractive indices are determined for the set of materials with regard to light at approximately 900 nm wavelength. Other materials are possible and may differ from the materials depicted in table 200.

As shown in FIG. 2, hydrogenated silicon (Si:H) is associated with a relatively high refractive index of 3.65 relative to the refractive indices of niobium pentoxide ($Nb_2O_5$) and/or tantalum pentoxide ($Ta_2O_5$) of, respectively, 2.28 and 2.12. A ratio of the high refractive index material to the low refractive index material of a set of layers corresponds to a quantity of layers used to cause polarization beamsplitting for an optical filter. For example, based on hydrogenated silicon being associated with a relatively high refractive index, use of hydrogenated silicon as a high refractive index material with silicon dioxide as a low refractive index material with a refractive index of 1.47, results in a relatively high ratio of refractive indices relative to using another material, such as tantalum pentoxide or niobium pentoxide, as a high refractive index material. In this case, an optical filter using alternating layers of hydrogenated silicon and silicon dioxide can perform polarization beamsplitting with a reduced quantity of layers relative to using tantalum pentoxide or niobium pentoxide as a high index material, thereby reducing a cost and/or a size of the optical filter and improving a durability of the optical filter and/or a set of optical characteristics of the optical filter.

As indicated above, FIG. 2 is provided merely as an example. Other examples are possible and may differ from what was described with regard to FIG. 2.

Figure 3:
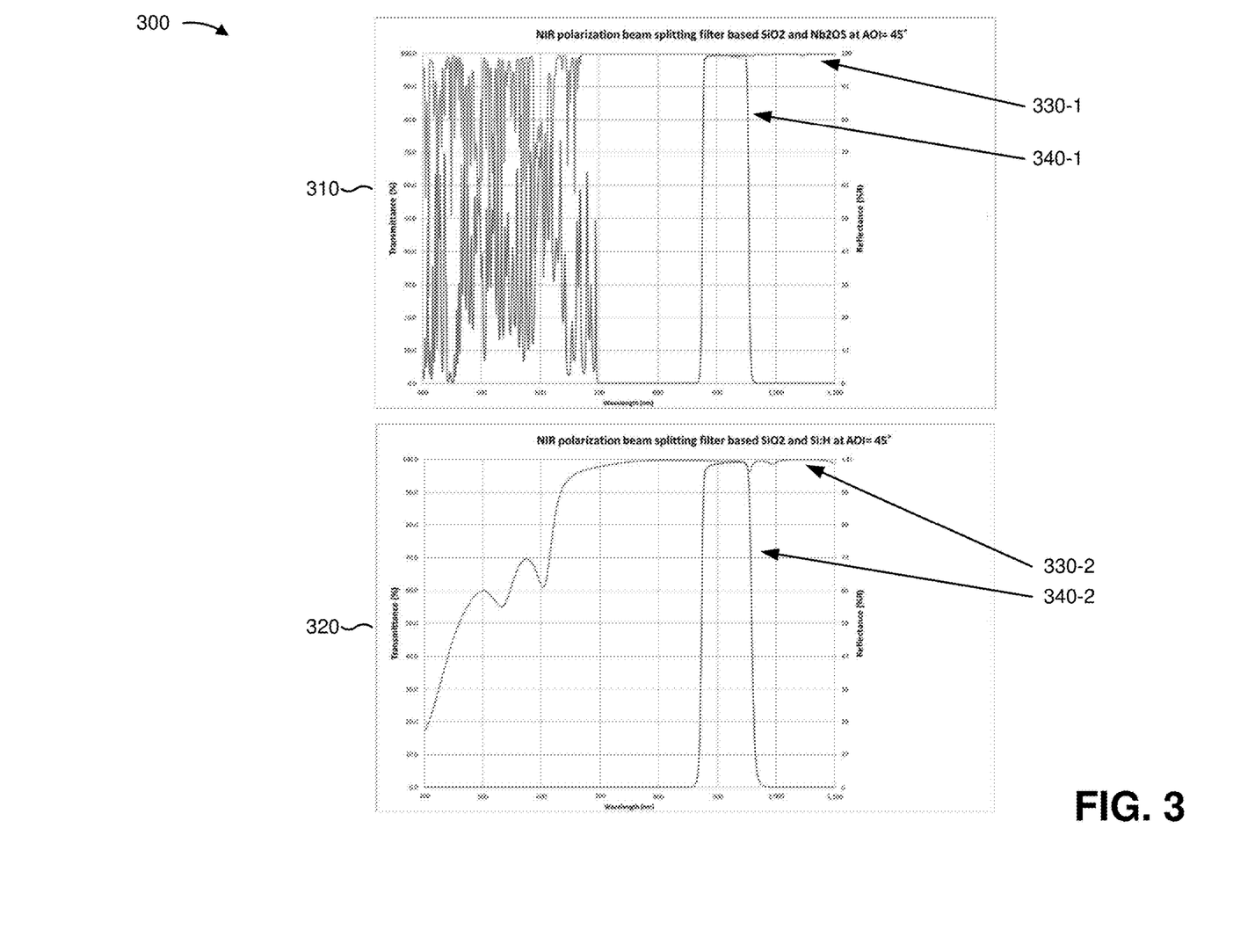
FIG. 3 is a diagram of example optical characteristics relating to using an example implementation described herein.

FIG. 3 is a diagram of example optical characteristics relating to using an example implementation described herein.

As shown in FIG. 3, and by charts 310 and 320, a set of optical filters may be utilized for NIR polarization beam splitting. Chart 310 shows example optical characteristics of NIR polarization beamsplitting at an angle of incidence (AOI) of 45 degrees with a first optical filter using niobium pentoxide as a high index material and silicon dioxide as a low index material. The first optical filter is associated with a thickness of 15.5 micrometers (μm) and 96 layers. Chart 320 shows example results of NIR polarization beamsplitting at an AOI of 45 degrees with a second optical filter using hydrogenated silicon as a high index material and silicon dioxide as a low index material. The second optical filter is associated with a thickness of 5.3 μm and 40 layers. In this way, an optical filter using hydrogenated silicon as a high index material performs NIR polarization beamsplitting with a reduced thickness and a reduced quantity of layers relative to using other materials as a high index material (e.g., niobium pentoxide), thereby reducing a cost and a size of the optical filter and improving durability of the optical filter.

As further shown in FIG. 3, reference numbers 330 show a reflection percentage in the s-plane for the first optical filter and the second optical filter. The s-plane may refer to a first polarization of a p-plane polarization and an s-plane polarization orthogonal coordinate system. In this case, the second optical filter provides greater than or equal to 99% reflectance for s-plane visible light, thereby obviating a need for additional blocking filters as is required for the first optical filter to be utilized. As further shown in FIG. 3, reference numbers 340 show a transmission percentage in the p-plane for the first optical filter and the second optical filter. In this case, the second optical filter provides greater than or equal to 99% transmission for p-plane light at a range of approximately 890 nm to approximately 940 nm (e.g., NIR light), greater than or equal to 95% transmission for p-plane light at a range of approximately 890 nm to approximately 960 nm, approximately 890 nm to approximately 940 nm, approximately 940 nm to approximately 960 nm, or the like. In this way, an optical filter using hydrogenated silicon exhibits improved optical performance for NIR polarization beamsplitting with regard to out-of-band blocking and in-band transmissivity relative to another filter using another material with a lower refractive index as a high index material, such as niobium pentoxide.

Although FIG. 3 shows an example relating to a particular value for transmission and reflectance over a particular spectral range and AOI, examples described herein may exhibit similarly improved performance for other values of transmission and reflectance, over other spectral ranges and for other AOIs.

As indicated above, FIG. 3 is provided merely as an example. Other examples are possible and may differ from what was described with regard to FIG. 3.

Figure 4:
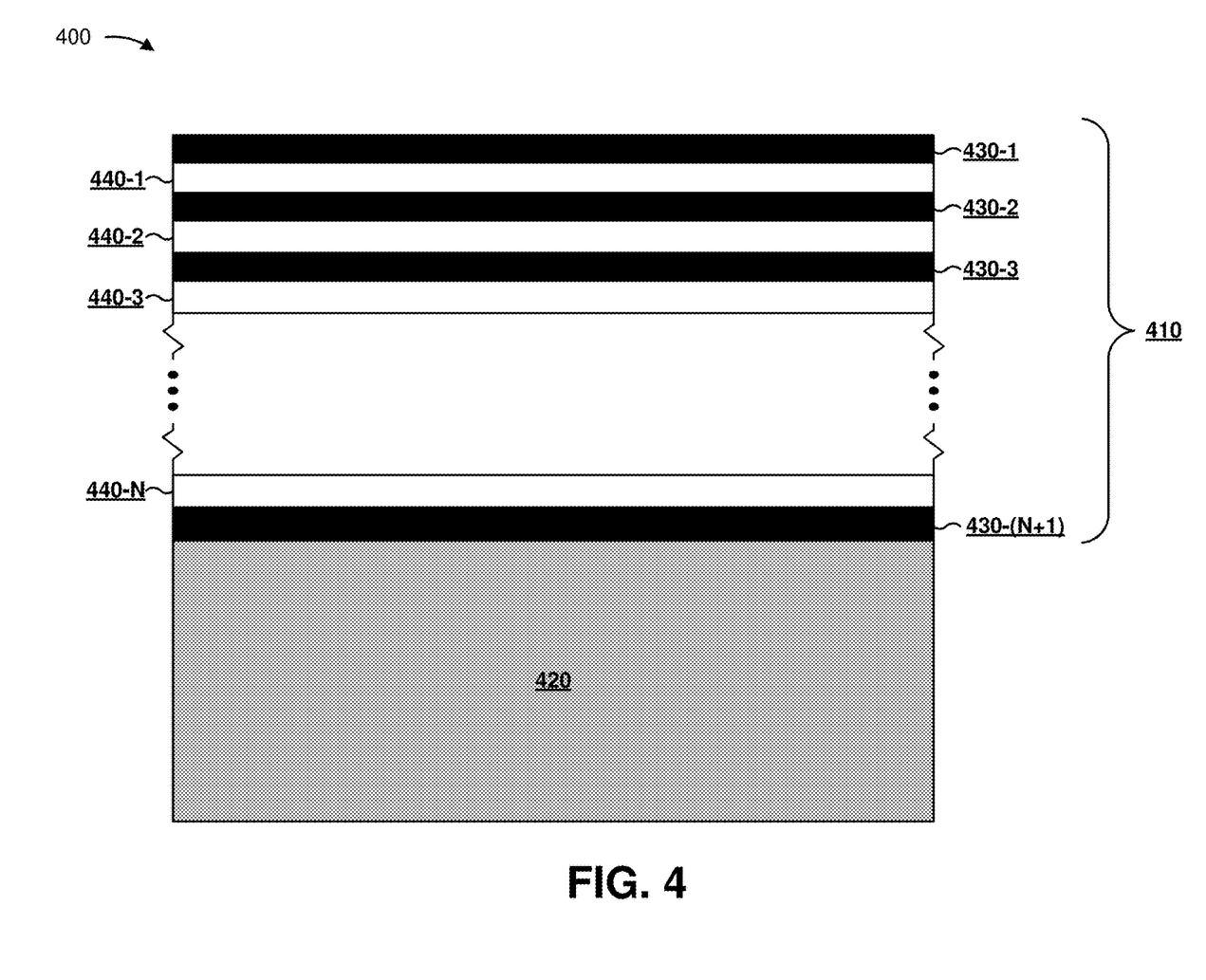
FIG. 4 is a diagram of an example implementation described herein.

FIG. 4 is a diagram of an example optical filter 400. FIG. 4 shows an example stackup of an optical filter using hydrogenated silicon as a high index material. As further shown in FIG. 4, optical filter 400 includes an optical filter coating portion 410 and a substrate 420.

Optical filter coating portion 410 includes a set of optical filter layers. For example, optical filter coating portion 410 includes a first set of layers 430-1 through 430-N (N≥1) and a second set of layers 440-1 through 440-(N+1). Layers 430 may include a set of layers of a high refractive index material (H layers), such as hydrogenated silicon layers. Layers 440 may include a set of layers of a low refractive index material (L layers), such as silicon dioxide layers, aluminum oxide ($Al_2O_3$) layers, magnesium fluoride ($MgF_2$) layers, or the like. In some implementations, layers 430 and 440 may be stacked in a particular order, such as an $(H-L)_m$ (m≥1) order, an $(H-L)_m$-H order, an $(L-H)_m$ order, an L-$(H-L)_m$ order, or the like. For example, as shown, layers 430 and 440 are positioned in an $(H-L)_n$-H order with an H layer disposed at a surface of optical filter 400 and an H layer disposed at a surface of substrate 420.

In some implementations, optical filter coating portion 410 may be associated with a particular quantity of layers, m. For example, as described with regard to FIG. 3, a hydrogenated silicon based optical filter may include 40 layers of alternating H layers and L layers. In another example, optical filter 400 may be associated with another quantity of layers, such as a range of 10 layers to 100 layers. In some implementations, each layer of optical filter coating portion 410 may be associated with a particular thickness. For example, layers 430 and 440 may each be associated with a thickness of between 3 nm and 300 nm, resulting in optical filter coating portion 410 being associated with a thickness of between 1 μm and 100 μm. In some implementations, layers 430 and 440 may be associated with multiple thicknesses, such as a first thickness for layers 430 and a second thickness for layers 440, a first thickness for a first subset of layers 430 and a second thickness for a second subset of layers 430, a first thickness for a first subset of layers 440 and a second thickness for a second subset of layers 440, or the like. In this case, a layer thickness and/or a quantity of layers may be selected based on an intended set of optical characteristics, such as an intended passband, an intended reflectance, or the like. For example, the layer thickness and/or the quantity of layers may be selected to permit a polarizing beamsplitter to be utilized for a spectral range of approximately 700 nm to approximately 1700 nm with a separation bandwidth of at least 10 nm.

In some implementations, a particular hydrogenated silicon based material may be selected for the H layers 430. In some implementations, layers 430 and/or 440 may be associated with a particular extinction coefficient, such as an extinction coefficient of less than approximately 0.001, less than approximately 0.0007, less than approximately 0.0006, less than approximately 0.0005, an extinction coefficient of less than approximately 0.0003, an extinction coefficient of less than approximately 0.0001, or the like over a particular spectral range (e.g., the spectral range of approximately 800 nm to approximately 1100 nm, the spectral range of approximately 900 nm to approximately 1000 nm, the wavelength of approximately 954 nm, or the like). In some implementations, layers 430 may be selected and/or manufactured to include a refractive index of greater than approximately 3, approximately 3.5, approximately 3.6, approximately 3.7, approximately 3.75 or the like over a particular spectral range (e.g., the spectral range of approximately 800 nm to approximately 1100 nm, the spectral range of approximately 900 nm to approximately 1000 nm, the wavelength of approximately 954 nm, or the like. In another example, layers 430 may be selected to include a refractive index of approximately 3.6 at a wavelength of approximately 830 nm. In some implementations, layers 430 and/or 440 may be manufactured to cause a first portion of light to be blocked (e.g., less than approximately 800 nm, less than approximately 700 nm, etc.) and a second portion of light to be passed (e.g., a spectral range less than approximately 1700 nm, at approximately 1550 nm, less than approximately 1100 nm, etc.).

In some implementations, a particular material may be selected for L layers 440. For example, layers 440 may include a set of silicon dioxide ($SiO_2$) layers, a set of aluminum oxide ($Al_2O_3$) layers, a set of titanium dioxide ($TiO_2$) layers, a set of niobium pentoxide ($Nb_2O_5$) layers, a set of tantalum pentoxide ($Ta_2O_5$) layers, a set of magnesium fluoride ($MgF_2$) layers, or the like. In this case, layers 440 may be selected to include a refractive index lower than that of the layers 430 over, for example, a particular spectral range (e.g., the spectral range of approximately 800 nm to approximately 1100 nm, the spectral range of approximately 900 nm to approximately 1000 nm, the wavelength of approximately 954 nm, or the like). For example, layers 440 may be selected to be associated with a refractive index of less than 3 over a particular spectral range (e.g., the spectral range of approximately 800 nm to approximately 1100 nm, the spectral range of approximately 900 nm to approximately 1000 nm, a spectral range of approximately 800 nm, the wavelength of approximately 954 nm, or the like).

In another example, layers 440 may be selected to be associated with a refractive index of less than 2.5 over a particular spectral range (e.g., the spectral range of approximately 800 nm to approximately 1100 nm, the spectral range of approximately 900 nm to approximately 1000 nm, a spectral range of approximately 800 nm, the wavelength of approximately 954 nm, or the like). In another example, layers 440 may be selected to be associated with a refractive index of less than 2 over a particular spectral range (e.g., the spectral range of approximately 800 nm to approximately 1100 nm, the spectral range of approximately 900 nm to approximately 1000 nm, a spectral range of approximately 800 nm, the wavelength of approximately 954 nm, or the like). In another example, layers 440 may be selected to be associated with a refractive index of less than 1.5 over a particular spectral range (e.g., the spectral range of approximately 800 nm to approximately 1100 nm, the spectral range of approximately 900 nm to approximately 1000 nm, the wavelength of approximately 954 nm, or the like). In some implementations, the particular material may be selected for L layers 440 based on a desired width of an out-of-band blocking spectral range, a desired center-wavelength shift associated with a change of AOI, or the like.

In some implementations, optical filter coating portion 410 may be fabricated using a sputtering procedure. For example, optical filter coating portion 410 may be fabricated using a pulsed-magnetron based sputtering procedure to sputter alternating layers 430 and 440 on a glass substrate. In some implementations, optical filter coating portion 410 may be associated with a relatively low center-wavelength shift with change in AOI. For example, optical filter coating portion 410 may cause a center-wavelength shift of less than approximately 20 nm, approximately 15 nm, approximately 12 nm, or the like in magnitude with a change in incidence angle from 0° to 30°. In some implementations, optical filter coating portion 410 is attached to a substrate, such as substrate 420. For example, optical filter coating portion 410 may be attached to a glass substrate. In some implementations, optical filter coating portion 410 may be associated with an incident medium, such as an air medium or glass medium, with a reflection of greater than 50% in a first polarization plane, with a transmission of greater than 50% in a second polarization plane, with a nominal AOI of incident light relative to a surface of optical filter 400 from 15° to 75°, and with a range of angles of incident light relative to the nominal AOI of 0° to 45°. In some implementations, optical filter 400 may be disposed between a set of prisms.

In some implementations, an annealing procedure may be utilized to fabricate optical filter coating portion 410. For example, after sputter deposition of layers 430 and 440 on a substrate, optical filter 400 may be annealed to improve one or more optical characteristics of optical filter 400, such as reducing an absorption coefficient of optical filter 400 relative to another optical filter for which an annealing procedure is not performed.

As indicated above, FIG. 4 is provided merely as an example. Other examples are possible and may differ from what was described with regard to FIG. 4.

In this way, a set of hydrogenated silicon layers may be used as a high index material for an optical filter coating of an optical filter to provide out-of-band blocking of visible light, transmission of NIR light, and polarization beamsplitting with a reduced thickness, cost, and time of manufacture relative to another type of material used for a set of high index layers. Moreover, based on using hydrogenated silicon, out-of-band blocking and in-band transmission are improved relative to another type of material.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A polarizing optical coating, comprising:
   a set of layers including:
      a first subset of layers,
         the first subset of layers comprising hydrogenated silicon (Si:H) with a first refractive index; and
      a second subset of layers, the second subset of layers comprising a material with a second refractive index,
the second refractive index being less than the first refractive index,
a first polarization of incident light, associated with the polarizing optical coating, being in the s-plane,
a second polarization of the incident light being in the p-plane,
the polarizing optical coating being associated with greater than or equal to 95% transmission for the second polarization of the incident light at a spectral range of at least one of:
approximately 890 nm to approximately 940 nm, or
approximately 930 nm to approximately 960,
the polarizing optical coating being associated with greater than or equal to 95% reflectance for the incident light in the s-plane,
the first subset of layers including a first layer associated with a first thickness,
the second subset of layers including a second layer associated with a second thickness, and
the second thickness being different from the first thickness.

2. The polarizing optical coating of claim 1,
where at least one of the first thickness or the second thickness is between 3 nm and 300 nm, and
where the material includes at least one of:
a silicon dioxide ($SiO_2$) material,
an aluminum oxide ($Al_2O_3$) material,
a titanium dioxide ($TiO_2$) material,
a niobium pentoxide ($Nb_2O_5$) material,
a tantalum pentoxide ($Ta_2O_5$) material, or
a magnesium fluoride ($MgF_2$) material.

3. The polarizing optical coating of claim 1,
where the first subset of layers are high refractive index layers (H) and the second subset of layers are low refractive index layers (L),
where the set of layers are arranged in at least one of:
an $(H-L)_m$ order,
an $(H-L)_m$-H order,
an $(L-H)_m$ order, or
an L-$(H-L)_m$ order,
where m is a quantity of layers, and
where the quantity of layers is selected based on an intended set of optical characteristics.

4. The polarizing optical coating of claim 1, where the set of layers is to block a threshold portion of light associated with a spectral range of less than approximately 700 nanometers (nm).

5. The polarizing optical coating of claim 1, where the set of layers is to pass a threshold portion of light associated with a spectral range of less than approximately 1700 nanometers (nm).

6. The polarizing optical coating of claim 1, where the first refractive index is greater than approximately 3 at a wavelength of approximately 900 nanometers (nm).

7. The polarizing optical coating of claim 1, where the first refractive index is approximately 3.6 at a wavelength of approximately 830 nanometers (nm).

8. The polarizing optical coating of claim 1, where the first subset of layers is associated with an extinction coefficient of less than approximately 0.0006 at a particular spectral range.

9. The polarizing optical coating of claim 1, where the second refractive index is less than 3 at a spectral range of approximately 800 nanometers (nm) to approximately 1100 nm.

10. The polarizing optical coating of claim 1, where the second refractive index is less than 2 at a spectral range of approximately 800 nanometers (nm) to approximately 1100 nm.

11. The polarizing optical coating of claim 1, where the polarizing optical coating is a polarization beam splitter.

12. The polarizing optical coating of claim 1, where the polarizing optical coating covers a spectral range from 700 nanometers (nm) to 1700 with a separation bandwidth of at least 10 nm.

13. The polarizing optical coating of claim 1, where the polarizing optical coating is associated with greater than 50% reflection in a first plane of polarization and greater than 50% transmission in a second plane of polarization,
the first plane of polarization being orthogonal to the second plane of polarization.

14. The polarizing optical coating of claim 1, where a nominal angle of incidence of light relative to a surface of the polarizing optical coating is between 15 degrees and 75 degrees.

15. The polarizing optical coating of claim 1, where a range of angles of light relative to a nominal angle of incidence is between 0 degrees and 45 degrees.

16. An optical filter, comprising:
a substrate; and
a set of alternating high refractive index layers and low refractive index layers disposed onto the substrate to polarization beam split incident light,
such that a first polarization of the incident light with a spectral range of less than approximately 800 nanometers (nm) is reflected by the optical filter and a second polarization of the incident light with a spectral range of greater than approximately 800 nm is passed through by the optical filter,
the first polarization of the incident light being in the s-plane,
the second polarization of the incident light being in the p-plane,
the optical filter being associated with greater than or equal to 95% transmission for the second polarization of the incident light at a spectral range of at least one of:
approximately 890 nm to approximately 940 nm, or
approximately 930 nm to approximately 960 nm, and
the optical filter being associated with greater than or equal to 95% reflectance for the incident light in the s-plane,
the high refractive index layers being hydrogenated silicon (Si:H),
the low refractive index layers being silicon dioxide ($SiO_2$),
the optical filter being associated with a quantity of layers of the high refractive index layers and the low refractive index layers, and
the quantity of layers being in a range of 10 layers to 100 layers.

17. The optical filter of claim 16,
where the optical filter is associated with greater than or equal to 99% transmission for the second polarization of the incident light at the spectral range of approximately 890 nm to approximately 940 nm; and where the optical filter is associated with greater than or equal to 99% reflectance for the incident light in the s-plane.

18. An optical system, comprising:
an optical transmitter to emit near-infrared (NIR) light toward a person for gesture recognition, toward an object for detecting objects in proximity to a vehicle or the person, or toward the object for detecting a proximity to the object using a LIDAR technique;
a polarizing optical filter to filter an input optical signal and provide the filtered input optical signal,
   the input optical signal including the NIR light from the optical transmitter and ambient light from another optical source,
   the polarizing optical filter including a set of dielectric thin film layers,
   the set of dielectric thin film layers including:
      a first subset of layers of hydrogenated silicon with a first refractive index, and
      a second subset of layers of a material with a second refractive index less than the first refractive index,
   a first polarization of incident light, associated with the polarizing optical filter, being in the s-plane,
   a second polarization of the incident light being in the p-plane,
   the polarizing optical filter being associated with greater than or equal to 95% transmission for the second polarization of the incident light at a spectral range of at least one of:
      approximately 890 nm to approximately 940 nm, or
      approximately 930 nm to approximately 960,
   the optical filter being associated with greater than or equal to 95% reflectance for the incident light in the s-plane,
   the first subset of layers including a first layer associated with a first thickness,
   the second subset of layers including a second layer associated with a second thickness, and
   the second thickness being different from the first thickness; and
an optical receiver to receive the filtered input optical signal and provide an output electrical signal.

19. The optical system of claim 18, where the polarizing optical filter is to polarization beam split the input optical signal to provide the filtered input optical signal.

20. The optical system of claim 18, where the polarizing optical filter is associated with greater than or equal to 99% transmission for the second polarization of the incident light at the spectral range of approximately 890 nm to approximately 940 nm.

* * * * *